US011470082B2

(12) United States Patent
Ikari (10) Patent No.: US 11,470,082 B2
(45) Date of Patent: Oct. 11, 2022

(54) AUTHENTICATION SERVER AND METHOD THAT PROVIDE AUTHENTICATION INFORMATION UPON INTERRUPTION OF POWER SUPPLY

(71) Applicant: Konica Minolta Business Solutions U.S.A., Inc., San Mateo, CA (US)

(72) Inventor: Hiroki Ikari, San Mateo, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 232 days.

(21) Appl. No.: 16/836,126

(22) Filed: Mar. 31, 2020

(65) Prior Publication Data

US 2021/0306332 A1 Sep. 30, 2021

(51) Int. Cl.
*H04L 9/40* (2022.01)
*G06F 1/30* (2006.01)
*G06F 1/26* (2006.01)
*H04L 67/1001* (2022.01)

(52) U.S. Cl.
CPC .......... *H04L 63/0876* (2013.01); *G06F 1/263* (2013.01); *G06F 1/305* (2013.01); *H04L 63/107* (2013.01); *H04L 67/1001* (2022.05)

(58) Field of Classification Search
CPC combination set(s) only.
See application file for complete search history.

(56) References Cited

U.S. PATENT DOCUMENTS

| 9,378,441 | B2* | 6/2016 | Goda | G06K 15/4055 |
| 2004/0215693 | A1* | 10/2004 | Thompson | G08C 19/00 709/201 |
| 2007/0210650 | A1* | 9/2007 | Togashi | G06F 11/1441 307/43 |
| 2009/0189736 | A1* | 7/2009 | Hayashi | G06F 21/32 340/5.81 |
| 2013/0262810 | A1* | 10/2013 | Chang | G06F 12/0246 711/170 |
| 2015/0338894 | A1* | 11/2015 | Cohen | G06F 1/263 713/310 |
| 2018/0288006 | A1* | 10/2018 | Somasandharam | H04L 9/3234 |
| 2019/0149684 | A1* | 5/2019 | Ishikawa | H04N 1/00925 358/1.14 |
| 2020/0235607 | A1* | 7/2020 | Kanarellis | G06F 1/30 |
| 2021/0306332 | A1* | 9/2021 | Ikari | G06F 1/305 |

* cited by examiner

*Primary Examiner* — Harris C Wang
(74) *Attorney, Agent, or Firm* — Osha Bergman Watanabe & Burton LLP (57) ABSTRACT

An authentication server is connected to a client device via a network and includes: an uninterruptible power supply (UPS) that supplies power to the authentication server upon interruption of a main power supply; a storage that stores a database including: a piece of user information of a user of the client device; and a piece of authentication information for the user to log into the client device or a predetermined server on the network via the client device; and a processor that, once the UPS starts to supply the power to the authentication server, transmits to the client device the piece of authentication information corresponding to the piece of user information before the authentication server is shut down.

15 Claims, 9 Drawing Sheets

| USER ID | PW | EMAIL ADDRESS | ACCOUNT INFORMATION | | DEVICE ID | ACCESSIBLE DEVICE | | |
| --- | --- | --- | --- | --- | --- | --- | --- | --- |
| | | | VALIDITY | EXPIRATION DATE | | PRIORITY 1 | PRIORITY 2 | PRIORITY 3 |
| aaa | AAA | aaa@hoge.com | Yes | 3/31/2020 | 123 | PC | ROOM DOOR | MFP |
| bbb | BBB | bbb@hoge.com | Yes | 4/1/2020 | 456 | MFP | PC | ROOM DOOR |
| ccc | CCC | ccc@hoge.com | No | 2/24/2019 | 789 | ROOM DOOR | PC | |
| ... | ... | ... | ... | ... | ... | ... | ... | ... |

FIG. 5

| AUTH INFORMATION | USERNAME: aaa | | USERNAME: bbb | | USERNAME: ccc | | |
|---|---|---|---|---|---|---|---|
| ACCESSIBLE DEVICE | ID | PW | ID | PW | ID | PW | |
| PC | aaa | aaa111 | bbb | bbb222 | ccc | ccc333 | ... |
| MFP | aAa | aaaAAA | bBb | bbbBBB | cCc | cccCCC | ... |
| ROOM DOOR | aaaxxx | XXXAAA | bbbyyy | YYYBBB | ccczzz | ZZZCCC | ... |

FIG. 6

| USER ID | PW | EMAIL ADDRESS | ACCOUNT INFORMATION | |
| --- | --- | --- | --- | --- |
| | | | VALIDITY | EXPIRE DATE |
| aaa | AAA | aaa@hoge.com | Yes | 3/31/2020 |
| bbb | BBB | bbb@hoge.com | Yes | 4/1/2020 |
| ccc | CCC | ccc@hoge.com | No | 2/24/2019 |
| ... | ... | ... | ... | ... |

AUTHENTICATION SERVER AND METHOD THAT PROVIDE AUTHENTICATION INFORMATION UPON INTERRUPTION OF POWER SUPPLY

BACKGROUND

Technical Field

The present invention generally relates to an authentication server and method that provide client devices with authentication information upon interruption of power supply.

Description of Related Art

Integrated security services authenticate and manage multiple devices on a network. With such services, users can integrally manage various devices such as security doors, multi-function peripherals (MFPs), cellular phones, and personal computers (PCs) on a single network. Users can also integrally manage various services on the network, such as cloud services, using those devices.

Some servers are equipped with uninterruptible power supplies (UPSs) that start to supply power to the servers upon interruption of a main power supply from a commercial power supply, and ensure time for preparation of shutdown before the servers are completely shut down.

However, the UPSs have limited power supply capacities and cannot continue to supply the power beyond the capacities. For this reason, there is a risk that the users could not be able to access some or all of the devices/services if the servers are completely shut down without any preparation due to sudden interruption of power supply.

SUMMARY

One or more embodiments of the invention provide an authentication server and method that provide client devices with authentication information upon power interruption in order to avoid a risk that the users become unable to access some or all of devices/services on a network.

One or more embodiments provide an authentication server connected to a client device via a network, the authentication server including: an uninterruptible power supply (UPS) that supplies power to the authentication server upon interruption of a main power supply; a storage that stores a database including: a piece of user information of a user of the client device; and a piece of authentication information for the user to log into the client device or a predetermined server on the network via the client device; and a processor that, once the UPS starts to supply the power to the authentication server, transmits to the client device the piece of authentication information corresponding to the piece of user information before the authentication server is shut down.

One or more embodiments provide a non-transitory computer readable medium (CRM) storing computer readable program code that is executed by a computer as an authentication server being connected to a client device via a network and including an uninterruptible power supply (UPS), a storage, and a processor, and causes the computer to execute: supplying, by the UPS, power to the authentication server upon interruption of a main power supply; storing, in the storage, a database including: a piece of user information of a user of the client device; and a piece of authentication information for the user to log into the client device or a predetermined server on the network via the client device; and once the UPS starts to supply the power to the authentication server, transmitting, by the processor to the client device, the piece of authentication information corresponding to the piece of user information before the authentication server is shut down.

One or more embodiments provide an authentication method using an authentication server that is connected to a client device via a network and includes an uninterruptible power supply (UPS), a storage, and a processor, the method including: supplying, by the UPS, power to the authentication server upon interruption of a main power supply; storing, in the storage, a database including: a piece of user information of a user of the client device; and a piece of authentication information for the user to log into the client device or a predetermined server on the network via the client device; and once the UPS starts to supply the power to the authentication server, transmitting, by the processor to the client device, the piece of authentication information corresponding to the piece of user information before the authentication server is shut down.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

[Authentication System]

One or more embodiments of the invention provide an authentication server and method that provide client devices with respective pieces of authentication information upon power interruption in order to avoid a risk that the users become unable to access some or all of devices/services on a communication network.

Figure 1:
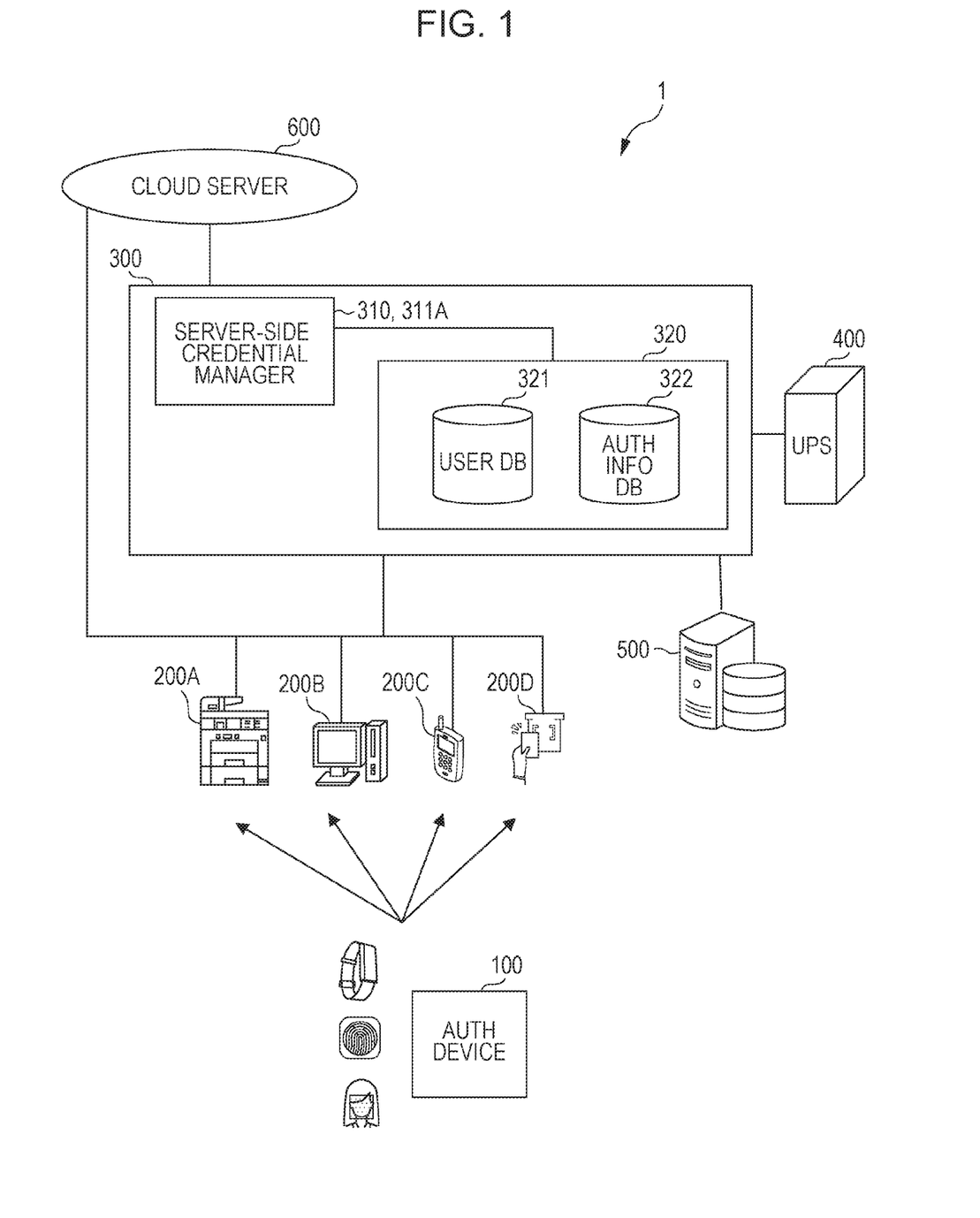
FIG. 1 is a schematic view of an authentication system according to one or more embodiments of the invention.

FIG. 1 is a schematic view of an authentication system 1 according to one or more embodiments of the invention. The authentication system 1 comprises: an authentication device 100; a plurality of client devices 200; an authentication server 300 equipped with a uninterruptible power supply (UPS) 400; an active directory (AD) server 500; and a cloud server 600, which are connected to a network (e.g., a local area network (LAN), a wide area network (WAN) such as the Internet, a mobile network, or any other type of network) via a network interface connection (not shown).

Upon receiving a piece of user information from the authentication device 100, one of the client devices 200 (e.g. PC 200B) transmits the same to the authentication server 300. Upon receiving the piece of user information, the authentication server 300 issues one or more pieces of authentication information to the one of the client devices 200. Then the one of the client devices 200 sends an authentication request together with the one or more pieces of authentication information to one or more external application servers on the network. Thus, the external application servers can perform authentication of the users.

Once the UPS 400 starts to supply power to the authentication server 300, the authentication server 300 transmits, to the one of the client devices 200, the one or more pieces of authentication information corresponding to the piece of user information before the authentication server 300 is shut down.

The authentication server 300 calculates a remaining time of power supply from the UPS 400, calculates a required time for preparation of shutdown of the authentication server 300, and determines whether the remaining time is less than the required time. Upon determining that the remaining time is equal to or larger (or longer) than the required time, the authentication server 300 transmits the one or more pieces of authentication information to the one of the client devices 200. Upon determining that the remaining time is less (or shorter) than the required time, the authentication server 300 prohibits the one or more pieces of authentication information from being transmitted to the one of the client devices 200.

Each of the components of the authentication system 1 will be described in detail below.

[Authentication Device]

The authentication device 100 is connected to the client devices 200 via a cable or the network. Alternatively, the authentication device 100 may be integrally configured with the client devices 200.

The authentication device 100 reads, as the piece of user information, a device ID from a portable device (e.g. a wristband, tablet computer, and cellular phone) carried by the user. In one or more embodiments, a security card that stores a card ID may be used instead of the portable device. Alternatively, the authentication device 100 may detect, as the piece of user information, biological information of the user, such as a finger print, face, iris, and voice. The authentication device 100 then sends the piece of user information to at least one of the client devices 200.

[Client Devices]

The client devices 200 are connected to the authentication server 300 and the cloud server 600 via the network. The client devices 200 of one or more embodiments include: a Multifunction Peripheral (MFP) 200A; a personal computer (PC) 200B; a cell phone 200C; and a security door 200D.

As one of the client devices 200, the configuration and function of the PC 200B will be described, while detailed explanations about the remaining client devices 200 are omitted as each of them has the similar structure and functions to those of the PC 200B.

Figure 2:
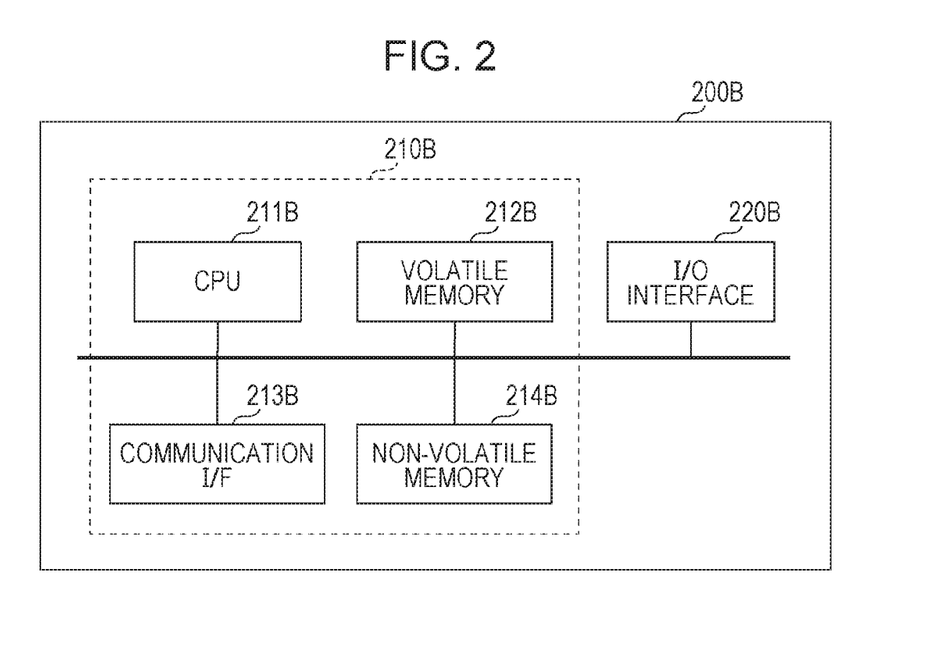
FIG. 2 is a hardware diagram of a client device according to one or more embodiments.

FIG. 2 is a hardware diagram of the PC 200B according to one or more embodiments. The PC 200B comprises a processor 210B comprising a central processing unit (CPU) 211B, a volatile memory 212B, a communication interface (IF) 213B, and a non-volatile memory 214B.

Upon receiving the piece of user information from the authentication device 100, the CPU 211B sends the same to the authentication server 300, and receives the one or more pieces of authentication information from the authentication server 300 via the communication IF 213B. Upon receiving the one or more pieces of authentication information from the authentication server 300, the CPU 211B sends the authentication request to the external application servers, and receives the authentication results from the external application servers via the communication IF 213B.

The volatile memory 212B may be random access memory (RAM), cache memory, etc. The communication I/F 213B is connected to the network to communicate with other devices also connected to the network. The non-volatile memory 214B may be read only memory (ROM), flash memory or hard disk, etc.

The volatile memory 212B and/or the non-volatile memory 214B store(s) the user information obtained by the authentication device 100 or directly obtained by the PC 200B itself, and the authentication information obtained from the authentication server 300. In one or more embodiments, the volatile memory 212B and/or the non-volatile memory 214B may also store a priority level for the PC 200B among the client devices 200 used by the same user.

The PC 200B further comprises the I/O interface 220B that may include an input device such as a touchscreen, keyboard, mouse, microphone, touchpad, electronic pen, or any other type of input device, and may also include an output device such as a screen (e.g. a liquid crystal display (LCD), a plasma display, touchscreen, cathode ray tube (CRT) monitor, projector, or any other display device), a printer, external storage, or any other output device. One or more of the output devices may be the same or different from the input device.

It is needless to say that the PC 200B may comprise other components that a general personal computer (PC) comprises. For example, the PC 200B may incorporate a camera, a microphone, and a speaker.

The same can be said for other client devices 200. For example, the MFP 200A may comprise an image forming device, a sheet feeding device, a finishing device, and so on. The cell phone 200C may incorporate a camera, a microphone, and a speaker. The security door 200D may comprise a card reader that scans an integrated circuit (IC) card, and an image sensor that takes images of visitors.

[Authentication Server]

Returning to FIG. 1, the authentication server 300 is connected to the client devices 200 and the AD server 500 via the network. The authentication server 300 stores and manages a plurality of pieces of user information and a plurality of pieces of authentication information synchronized with part or all of the information stored in the AD server 500. Upon receiving the piece of user information from at least one of the client devices 200, the authentication server 300 returns the one or more pieces of authentication information to the one of the client devices 200.

Each piece of user information identifies a specific user. A plurality of pieces of user information for each user may include an user ID, biological information of the user, a PIN number, a card ID, and a device ID owned by the user.

The one or more pieces of authentication information are used for authenticating each user who logs into one of the client devices 200 and servers on the network. The plurality of pieces of authentication information for each user to log into each of the devices and servers may include a user name, a password, a communication protocol, and so on. The authentication server 300 may send the one or more pieces of authentication information to each of the client devices 200, depending on types of the devices and/or servers that provide various services.

In one or more embodiments, the authentication server 300 may set predetermined restrictions in issuance of the one or more pieces of authentication information. For example, the authentication server 300 may set an expiration date of each piece of authentication information. The authentication server 300 may also set the upper limit number of time of issuance of each piece of authentication information.

Figure 3:
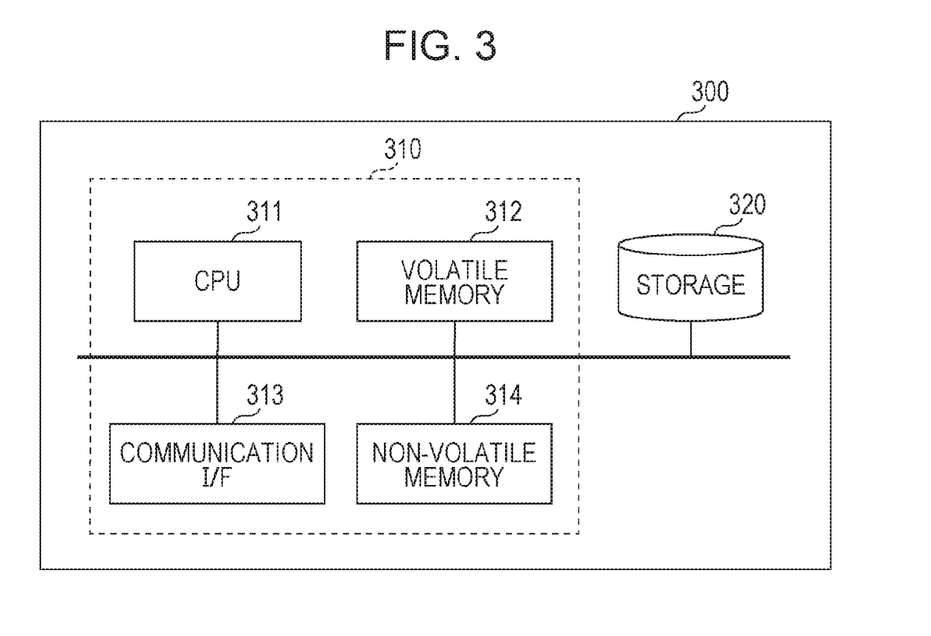
FIG. 3 is a hardware diagram of an authentication server according to one or more embodiments.

FIG. 3 is a hardware diagram of the authentication server 300 according to one or more embodiments. The authentication server 300 comprises a processor 310 comprising a central processing unit (CPU) 311, a volatile memory 312, a communication interface (IF) 313, and a non-volatile memory 314, each of which may have similar configurations to those of the PC 200B illustrated in FIG. 2.

The CPU 311 of one or more embodiments functions as the server-side credential manager 311A, as shown in FIG. 1. Upon receiving the piece of user information from the PC 200B, the server-side credential manager 311A searches an authentication information database 322 of a storage 320 described later for the one or more pieces of authentication information corresponding to the piece of user information. The CPU 311 then transmits the searched authentication information to the PC 200B via the communication IF 313.

Once the UPS 400 starts to supply the power to the authentication server 300, the CPU 311 calculates the remaining time of power supply from the UPS 400 based on predetermined information of the UPS 400. The predetermined information may include, for example, a total battery capacity of the UPS 400, an elapsed time since the UPS 400 is used last time (i.e., charging time of the UPS 400), and total power consumption of devices/equipment connected to the UPS 400. The CPU 311 of one or more embodiments may calculate the remaining time, for example, by multiplying the total battery capacity by a predetermined coefficient corresponding to the elapsed time to obtain a remaining battery capacity, and by determining the remaining time based on the multiplied value (i.e., the remaining battery capacity) and the total power consumption. The CPU 311 may use a table in which elapsed times and coefficients are correlated to each other. For example, coefficient "1" may be correlated to the elapsed time of 24 hours or more, and coefficient "0.5" may be correlated to the elapsed time of 6 hours.

The predetermined information may be acquired from the UPS 400 via the cable or the network, or may be previously stored in the volatile memory 312, the non-volatile memory 314, and/or the storage 320. For example, the volatile memory 312, the non-volatile memory 314, and/or the storage 320 may previously store the table of the elapsed times and the coefficients described above.

The CPU 311 also calculates the required time for preparation of shutdown of the authentication server 300. The preparation of shutdown includes, for example, saving data/information stored in the volatile memory 312 and/or the non-volatile memory 314 also in the storage 320, terminating applications/services (e.g., Web server service for operating the authentication server 300 via a browser of the PC 200) executed by the authentication server 300, and disconnecting from the network and/or peripheral equipment (e.g., USB connected storage). Necessary processing for such preparation and the required time may be previously stored in the volatile memory 312, the non-volatile memory 314, and/or the storage 320.

If the remaining time of power supply is equal to or larger than the required time for preparation of shutdown, the CPU 311 issues the one or more pieces of authentication information to the PC 200B. If the remaining time of power supply is less than the required time for preparation of shutdown, the CPU 311 prohibits the one or more pieces of authentication information from being transmitted to the PC 200B. In this case, the CPU 311 executes the preparation processing for shutdown, without issuing the authentication information.

The authentication server 300 further comprises the storage 320, which may be a non-volatile memory such as hard disks or flash memories, etc. As illustrated in FIG. 1, the storage 320 comprises a user database 321 that stores the plurality of pieces of user information of users of the client devices 200, and the authentication information database 322 that stores the plurality of pieces of authentication information for the users to log into at least one of the client devices 200 or a predetermined server on the network via the one of the client devices 200.

The storage 320 may also store the predetermined restrictions in issuance of the authentication information. For example, the storage 320 may store the expiration date of each piece of authentication information, and the upper limit number of time of issuance of each piece of authentication information.

Figure 4:
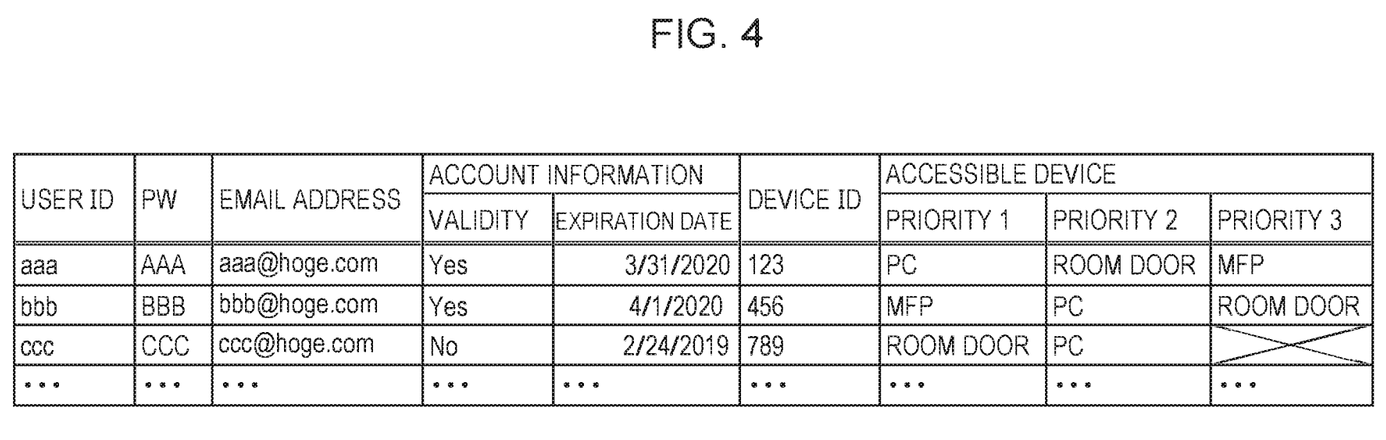
FIG. 4 is a table showing a database of user information stored in the authentication server according to one or more embodiments.

FIG. 4 is a table showing the user database 321 according to one or more embodiments. The user database 321 includes items of (i) User ID, (ii) Password, (iii) Email Address, (iv) Account Information including Validity and Expiration Date, (v) Device ID, and (vi) Accessible Device. In one or more embodiment, the Accessible Device may include the cloud server 600 in addition to the MFP 200A, PC 200B, cell phone 200C, and security door 200D. The user database 321 may include certificates and expiration dates thereof described later, though not illustrated.

In the column of Accessible Device, the client devices 200 (e.g., the MFP 200A, PC 200B, and security door 200D) are correlated to their priority levels, respectively. For example, for a user whose user ID is "aaa," the client devices 200 accessible to the authentication server 300 are: the PC 200B having the highest priority level (priority: 1); the security room door 200D having the middle priority level (priority: 2); and the MFP 200A having the lowest priority level (priority: 3).

The number of priority levels is not limited to three, and may be one, two, or four or more. The priority levels for the respective client devices 200 may be set and/or changed by the server-side credential manager 311A. Alternatively, the priority levels may be set by the user via an input/output (I/O) interface of the authentication server 300 described later, or via the I/O interface 220B of the PC 200B or other client devices 200. The priority levels may be determined depending on frequency of use of the client devices 200, and/or a roll of the user. For example, the higher the frequency of use, the higher priority level. As another example, if the roll of the user is a sales representative who often works out of office, the PC 200B may have the relatively higher priority than the MFP 200A and security door 200D used in the office.

Figure 5:
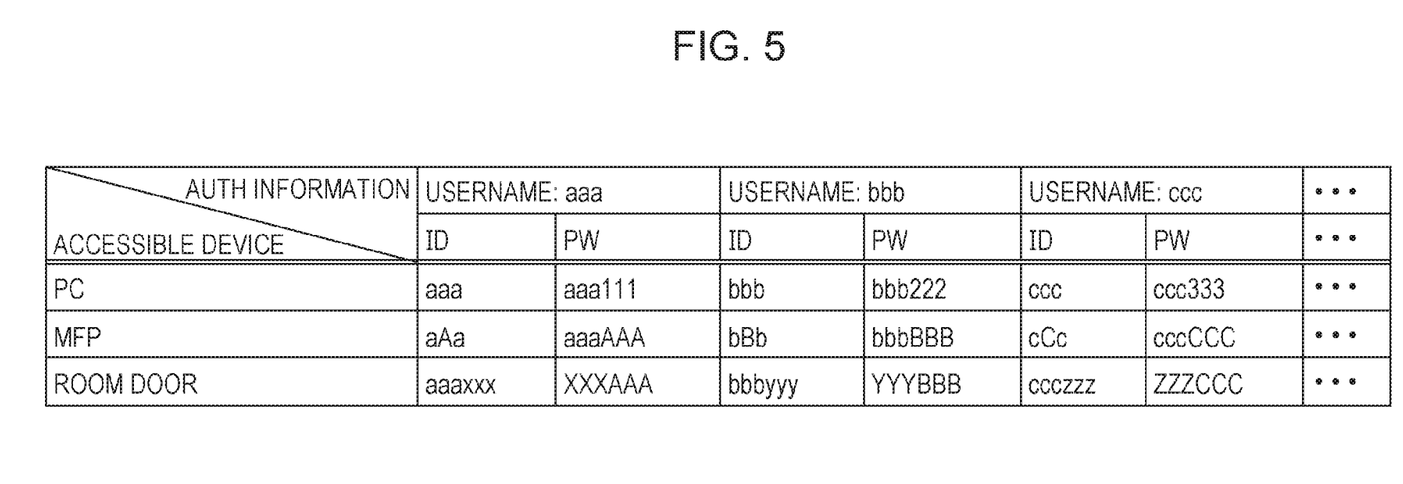
FIG. 5 is a table showing a database of authentication information stored in the authentication server according to one or more embodiments.

FIG. 5 is a table showing the authentication information database 322 according to one or more embodiments. The authentication information database 322 stores the plurality of pieces of authentication information for the respective client devices 200 of each user. For example, for a user whose username is "aaa," the authentication information for the user to log into the PC 200B, MFP 200A, and security room door 200D are: ID "aaa" and password "aaa111"; ID "aAa" and password "aaaAAA"; and ID "aaaxxx" and password "XXXAAA," respectively.

The non-volatile memory 314 and/or the storage 320 also store(s) the remaining time of power supply from the UPS 400, and the required time for preparation of shutdown of the authentication server 300.

In one or more embodiments, the authentication server 300 may comprise the I/O interface, which has a similar configuration to that of the I/O interface 220B illustrated in FIG. 2.

[Uninterruptible Power Supply (UPS)]

Returning to FIG. 1, the UPS 400 is physically connected to the authentication server 300 via a cable or the like. Alternatively, the UPS 400 may be integrally configured with the authentication server 300 in one or more embodiments.

Upon interruption of the main power supply from the commercial power supply, the UPS 400 starts to supply the power to the authentication server 300. The UPS 400 of one or more embodiments may send the predetermined information required for calculating the remaining time of power supply to the authentication server 300, upon receiving a request from the authentication server 300.

[AD Server]

The AD server 500 is connected to the authentication server 300 via the network. Alternatively, the AD server 500 may be integrally configured with the authentication server 300, as an internal server, in one or more embodiments.

The AD server 500 of one or more embodiments comprises a processor and a storage, each of which may have similar configurations to those of the authentication server 300 illustrated in FIG. 3. The AD server 500 manages the plurality of pieces of user information and the plurality of pieces of authentication information in the storage. The AD server 500 synchronizes with the authentication server 300 and the external application servers, and provides the servers with part of all of the plurality of pieces of user information and the plurality of pieces of authentication information, as necessary.

Figure 6:
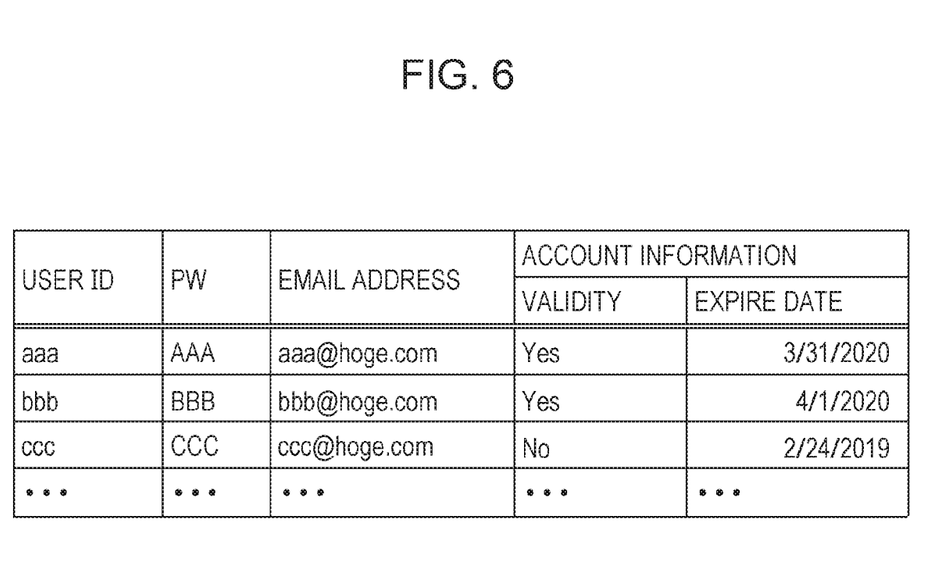
FIG. 6 is a table showing a database of the user information stored in an active directory (AD) server according to one or more embodiments.

FIG. 6 is a table showing a database of the plurality of pieces of user information stored in the AD server 500 according to one or more embodiments. As shown in FIG. 6, at least part of the plurality of pieces of user information stored in the AD server 500 coincide with at least part of the plurality of pieces of user information stored in the user database 320 of the authentication server 300, in one or more embodiments.

[Cloud Services]

The cloud server 600 is connected to the client devices 200 and the authentication server 300 via the Internet. The cloud server 600 of one or more embodiments may comprise a processor and a storage, each of which may have similar configurations to those of the authentication server 300 illustrated in FIG. 3. The users of the client devices 200 authenticated by the authentication server 300 can utilize services provided by the cloud server 600 via the client devices 200.

Although not illustrated in FIG. 1, the external application servers that manage the workflows and/or applications for operating at least one of the client devices 200 may be connected to at least one of the client devices 200 via the network. The external application servers may perform the authentication of the users using the one or more pieces of authentication information sent from the client devices 200, upon receiving authentication requests from the client devices 200. Upon successful authentication, the client devices 200 allow the user to log into the client devices 200 and/or the cloud server 600 via the Internet. Thus, the users can utilize applications/services provided by the client devices 200 and/or by the external application servers via the client devices 200.

Next, the authentication method using the authentication system 1 will be described below with reference to FIGS. 7-10.

[Registration Processing of User Information]

Figure 7:
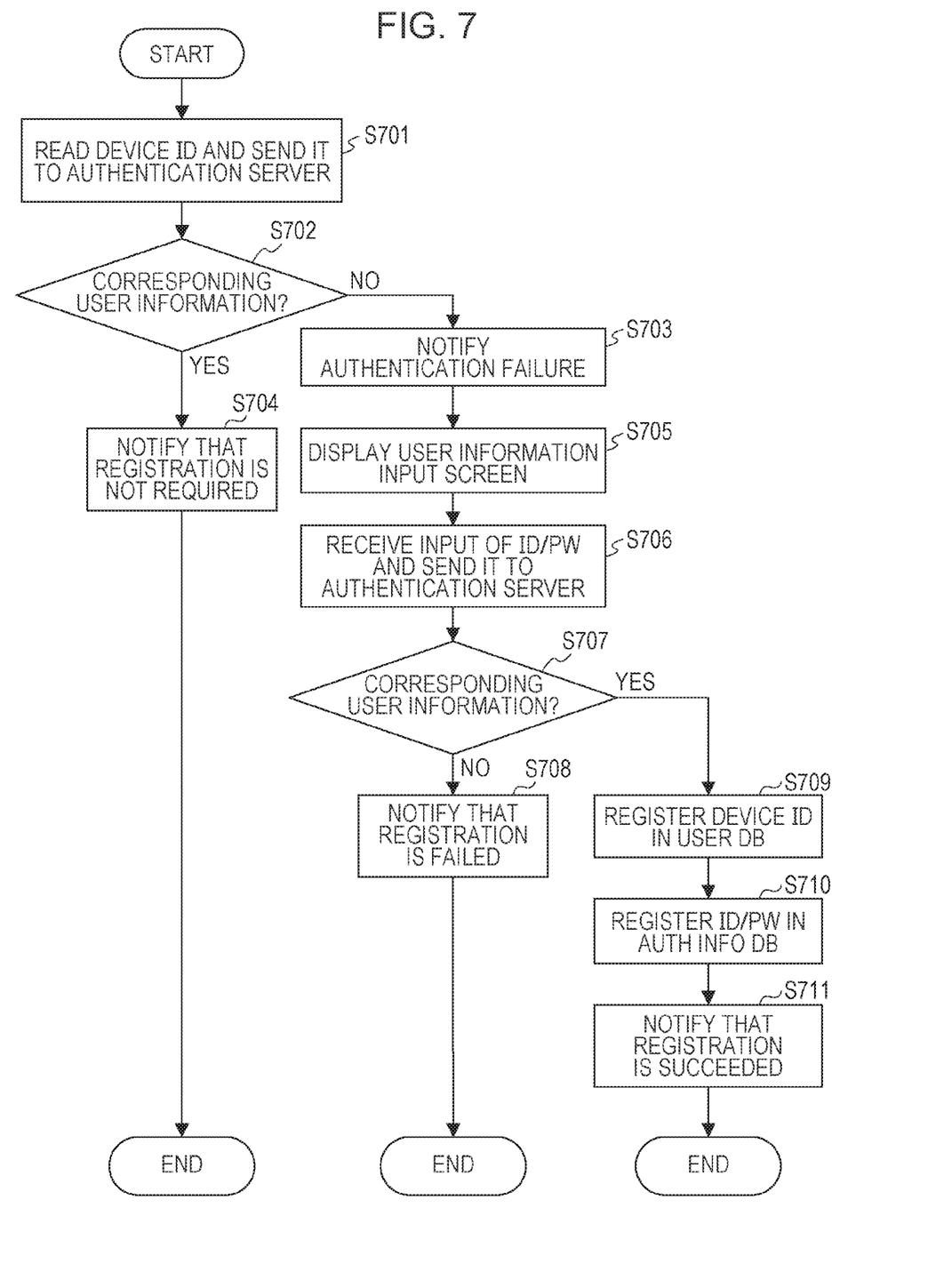
FIG. 7 is a flowchart showing an authentication method according to one or more embodiments.

First, registration processing when the user of one of the client devices 200, e.g. the PC 200B, registers the user information in the authentication server 300 will be described with reference to the flowchart of FIG. 7. One or more of the steps in FIG. 7 may be performed by the components of the authentication system 1, discussed above in reference to FIG. 1. In one or more embodiments, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7.

When the user brings the portable device close to the authentication device 100, the authentication device 100 reads the device ID from the portable device and sends the same to the PC 200B. Upon receiving the device ID from the authentication device 100, the PC 200B sends the device ID to the authentication server 300 (Step S701).

Upon receiving the device ID from the PC 200B, the authentication server 300 searches the user database 321 for one or more pieces of user information corresponding to the device ID, and determines whether the user database 321 contains the corresponding user information (Step S702).

Upon determining that the user database 321 does not contain the corresponding user information (Step S702: NO), the authentication server 300 notifies authentication failure to the PC 200B (Step S703).

Upon determining that the user database 321 contains the corresponding user information (Step S702: YES), the authentication server 300 notifies to the PC 200B that registration of the user information is not required (Step S704). Then the processing is terminated.

Once the authentication failure is notified, the PC 200B displays a user information input screen on the I/O interface 220B (Step S705). Upon receiving the input of user ID/password from the user via the I/O interface 220B, the PC 200B sends the user ID/password to the authentication server 300 (Step S706).

In one or more embodiments, the PC 200B may display a priority input screen on the I/O interface 220B. Upon receiving an input of the priority level for the PC 200B via the priority input screen, the PC 200B sends the priority level to the authentication server 300, for example, in Step S701. Alternatively, the PC 200B may display the priority input screen as well as the user information input screen in Step S705. Upon receiving the input of the priority level for the PC 200B via the priority input screen, the PC 200B sends the priority level, as well as the user ID/password, to the authentication server 300 in Step S706.

Upon receiving the user ID/password from the PC 200B, the authentication server 300 determines whether the user database 321 contains the one or more pieces of user information corresponding to the user ID/password (Step S707).

Upon determining that the user database 321 does not contain the corresponding user information (Step S707: NO), the authentication server 300 notifies registration failure to the PC 200B (Step S708). Then the processing is terminated.

Upon determining that the user database 321 contains the corresponding user information (Step S707: YES), the authentication server 300 registers the device ID, as the piece of user information, in the user database 321 (Step S709). In the case that the PC 200B sends the priority level to the authentication server 300, the priority level is stored in the user database 321. The authentication server 300 also registers the user ID/password, as the pieces of authentication information, in the authentication information database 322 (Step S710). The authentication server 300 then notifies successful registration (Step S711), and the processing is terminated.

[Authentication Processing During Normal Operation]

Figure 8:
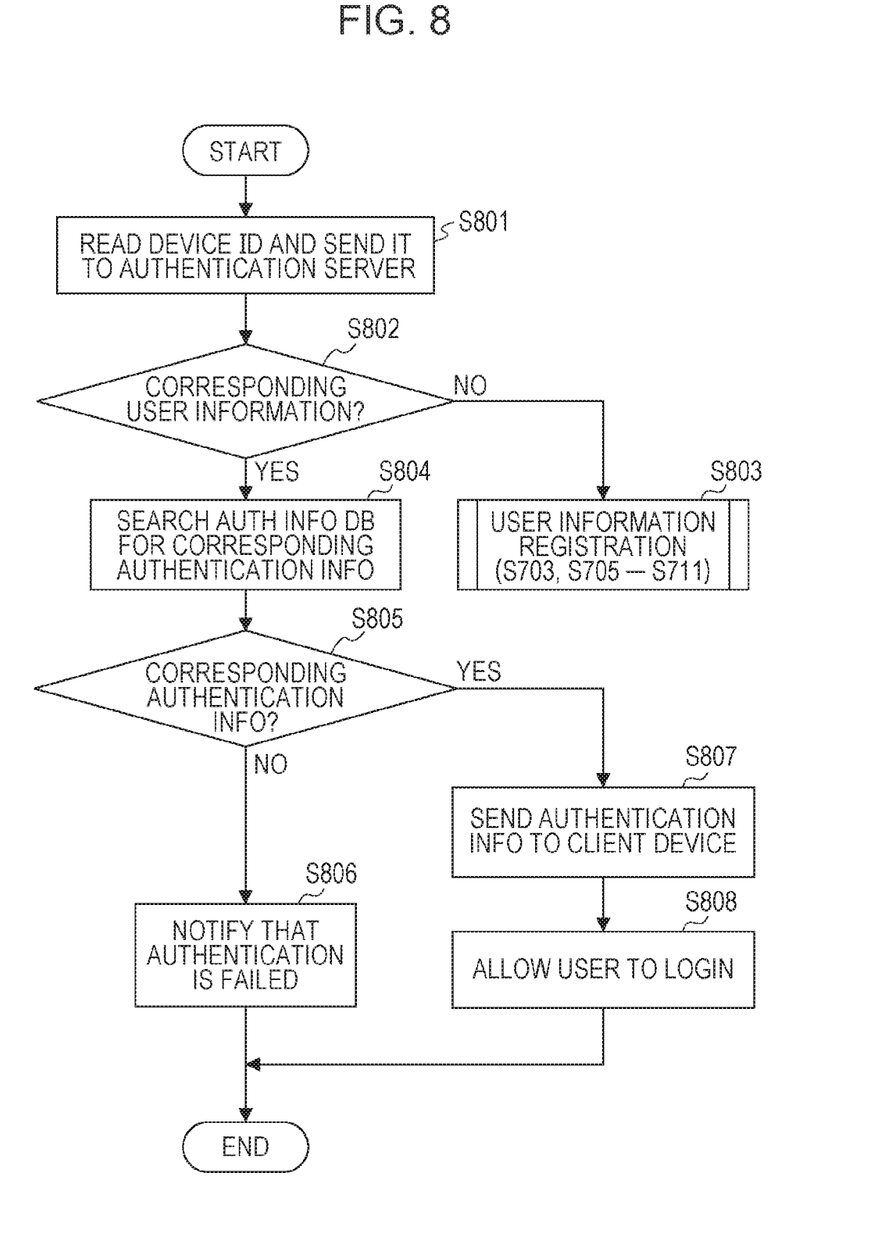
FIG. 8 is a flowchart showing an authentication method according to one or more embodiments.

Next, authentication processing when the authentication server 300 is operating with the main power supply from commercial power supply will be described with reference to the flowchart of FIG. 8. One or more of the steps in FIG. 8 may be performed by the components of the authentication system 1, discussed above in reference to FIG. 1. In one or more embodiments, one or more of the steps shown in FIG. 8 may be omitted, repeated, and/or performed in a different order than the order shown in FIG. 8. Accordingly, the scope of the invention should not be considered limited to the specific arrangement of steps shown in FIG. 8.

Once the authentication device 100 reads the device ID from the portable device and sends the same to the PC 200B, the PC 200B sends the device ID to the authentication server 300 (Step S801).

Upon receiving the device ID from the PC 200B, the authentication server 300 determines whether the user database 321 contains the one or more pieces of user information corresponding to the device ID (Step S802).

Upon determining that the user database 321 does not contain the corresponding user information (Step S802: NO), the registration processing of the user information, i.e., the processing of Steps S703, S705-S711 in FIG. 7 is performed (Step S803).

Upon determining that the user database 321 contains the corresponding user information (Step S802: YES), the authentication server 300 searches the authentication information database 322 for the one or more pieces of authentication information corresponding to the piece of user information (e.g. the user ID) (Step S804), and determines whether the authentication information database 322 contains the corresponding authentication information (Step S805).

Upon determining that the authentication information database 322 does not contain the corresponding authentication information (Step S805: NO), the authentication server 300 notifies authentication failure to the PC 200B (Step S806). Then the processing is terminated.

Upon determining that the authentication information database 322 contains the corresponding authentication information (Step S805: YES), the authentication server 300 sends the corresponding authentication information to the PC 200B (Step S807). In one or more embodiments, the pieces of authentication information may be a combination of the user ID and password registered in the authentication information database 322. Alternatively, a certificate may be issued, instead of the user ID and password, to allow the user to log into the PC 200B. The certificate is information indicating that the user is authenticated by a proper server, namely, the authentication server 300 in this example. To certificate, an expiration date (e.g., two or three days) can be set in order to prevent the certificate from being improperly used after recovery from interruption of power supply. In the case that the certificate is issued, the certificate and the expiration date are stored in the authentication information database 322, and the password do not need to be saved in the authentication information database 322. In one or more embodiments, the certificate may be shared among different kinds of the client devices 200.

Upon receiving the corresponding authentication information, the PC 200B checks the corresponding authentication information or the certificate and allows the user to log into the PC 200B (Step S808). After that, the PC 200B can be operated by the user according to the workflows and/or applications, and the cloud server 600 can provide the user with various services via the PC 200B and the network. Then the processing is terminated.

[Authentication Processing Upon Interruption of Power Supply]

Figure 9:
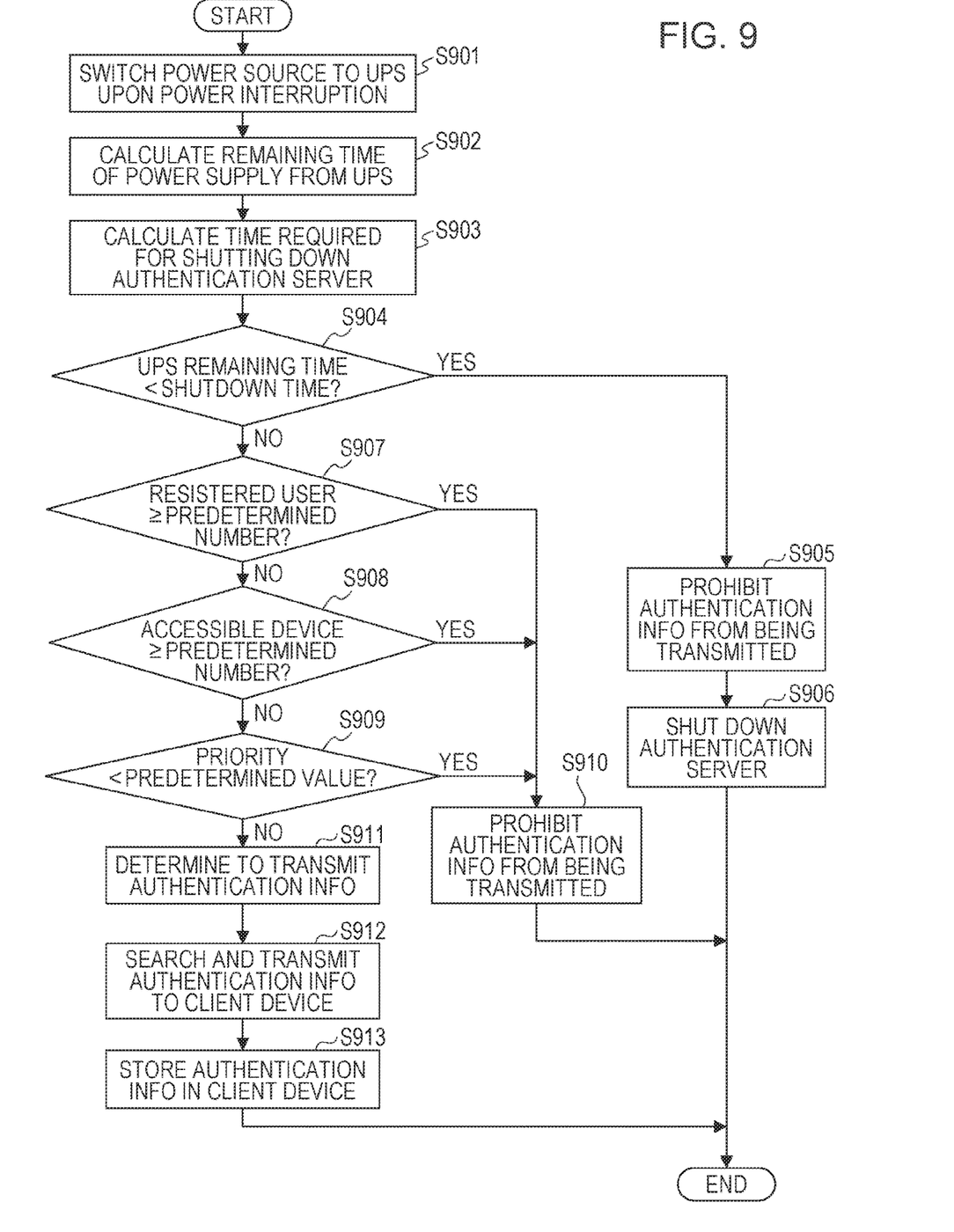
FIG. 9 is a flowchart showing an authentication method according to one or more embodiments.

Now the authentication processing when the power supply is switched from the main power supply to the UPS 400 will be described with reference to the flowchart of FIG. 9. One or more of the steps in FIG. 9 may be performed by the components of the authentication system 1, discussed above in reference to FIG. 1. In one or more embodiments, one or more of the steps shown in FIG. 9 may be omitted, repeated, and/or performed in a different order than the order shown in FIG. 9. Accordingly, the scope of the invention should not be considered limited to the specific arrangement of steps shown in FIG. 9.

Once the power supply is switched to the UPS 400 (Step S901), the authentication server 300 calculates the remaining time of power supply from the UPS 400 (Step S902). Alternatively, the authentication server 300 may acquire from the UPS 400 the remaining time calculated by the UPS 400. The authentication server 300 also calculates the required time for shutting down the authentication server 300 (S903).

Then the authentication server 300 compares the remaining time of power supply from the UPS 400 with the required time for shutdown of the authentication server 300, and determines whether the remaining time of power supply is less than the required time for shutdown (Step S904).

Upon determining that the remaining time of power supply is less than the required time for shutdown (Step S904: YES), the authentication server 300 prohibits the one or more pieces of authentication information from being transmitted to the PC 200B (Step S905). In this case, the authentication server 300 executes the preparation processing before being shut down, without transmitting the authentication information to the client devices 200. The authentication server 300 is shut down after the UPS 400 stops supplying the power (Step S906). Then the processing is terminated.

Upon determining that the remaining time of power supply is equal to or larger than the required time for shutdown (Step S904: NO), the authentication server 300 determines whether the number of users registered in the authentication server 300 is equal to or larger than the predetermined number, based on the plurality of pieces of user information for the users to log into the client devices or the predetermined server (Step S907).

Upon determining that the number of registered users is equal to or larger than the predetermined number (Step S907: YES), the authentication server 300 prohibits the plurality of pieces of authentication information from being transmitted to the PC 200B (Step S910). Then the processing is terminated.

Upon determining that the number of registered users is less than the predetermined number (Step S907: NO), the authentication server 300 determines whether the number of the accessible client devices 200 owned by the same user is equal to or larger than the predetermined number, based on the piece of user information of the same user (Step S908).

Upon determining that the number of the accessible client devices 200 owned by the same user is equal to or larger than the predetermined number (Step S908: YES), the authentication server 300 prohibits the pieces of authentication information from being transmitted to the client devices 200 including the PC 200B (Step S910). Then the processing is terminated.

Upon determining that the number of the accessible client devices 200 owned by the same user is less than the predetermined number (Step S908: NO), the authentication server 300 determines, for each user, whether the priority level of at least one (e.g. the PC 200B) of the client devices 200 is less (or lower) than a predetermined level (Step S909).

Upon determining that the priority level of the one of the client devices 200 is less than the predetermined level (Step S909: YES), the authentication server 300 prohibits one of the plurality of pieces of authentication information for the user to log into the one of the client devices 200 or the predetermined server (e.g. cloud server) from being transmitted to the one of the client devices 200 (Step S910). For example, in the case that the predetermined level is the middle priority level of "priority 2," the authentication information is not sent to the client devices 200 having the lowest priority level of "priority 3." Then the processing is terminated.

Upon determining that the priority level of the one of the client devices 200 is equal to or larger (or higher) than the predetermined level (Step S909: NO), the authentication server 300 determines to transmit the one of the plurality of pieces of authentication information to the one of the client devices 200 (Step S911).

In one or more embodiments, the authentication server 300 may transmit the authentication information to at least one of the client devices 200 regardless of the priority levels for the client devices 200. For example, in the case that the PC 200B has the middle priority of "priority 2" and the cloud server 600 has the highest priority level of "priority 1," if the user needs to use the PC 200B to access the cloud server 600, the authentication information may be sent not only to the cloud server 600 but also to the PC 200B even when the predetermined level is "priority 1." As another example, for the user who usually works in an office and does not work remotely, the authentication information may be sent to the security door 200D at the highest priority regardless of the priority level set to the security door 200D.

Upon determining to transmit the one of the plurality of pieces of authentication information, the authentication server 300 searches the authentication information database 322 for the one of the plurality of pieces of authentication information, and transmits the same to the one of the client devices 200 (Step S912).

In one or more embodiments, the authentication server 300 may send, to the one of the client devices 200 (e.g. the PC 200B), the plurality of pieces of authentication information for the user to log into the multiple client devices 200 (e.g. the MFP 200A, PC 200B, security door 200D, and cloud service). To the authentication information, the predetermined restrictions in issuance of the authentication information, for example, the expiration dates of the authentication information, and/or the upper limit number of time of issuance of the authentication information may be attached.

Upon receiving the one of the plurality of pieces of authentication information from the authentication server 300, the one of client devices 200 stores the same (Step S913). Then the processing is terminated.

In the above processing, the order of Steps S907-S909 may be arbitrary changed. Furthermore, Steps S907-S909 are optional, and one to three of them and Step S910 may be omitted from the processing.

[Authentication Processing after Power Shutdown]

Figure 10:
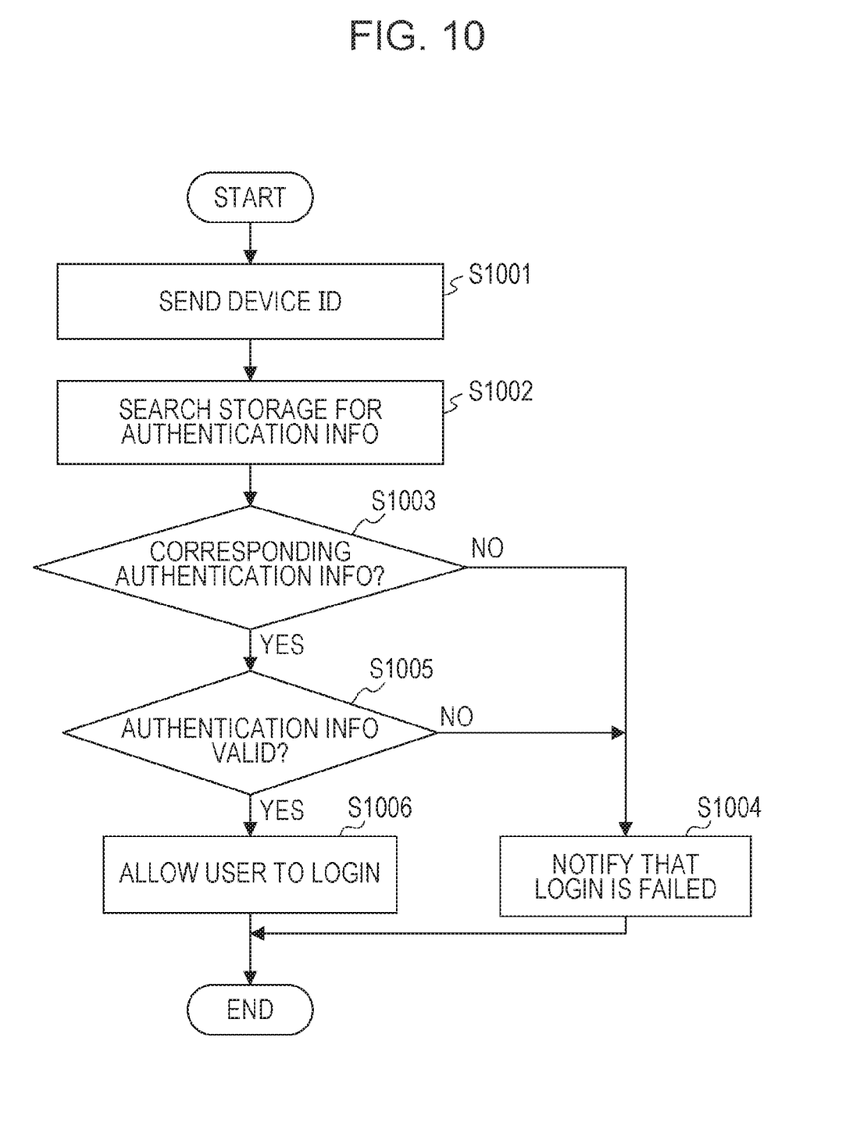
FIG. 10 is a flowchart showing an authentication method according to one or more embodiments.

Lastly, the authentication processing after the authentication server 300 is shut down will be described with reference to the flowchart of FIG. 10. One or more of the steps in FIG. 10 may be performed by the components of the authentication system 1, discussed above in reference to FIG. 1. In one or more embodiments, one or more of the steps shown in FIG. 10 may be omitted, repeated, and/or performed in a different order than the order shown in FIG. 10. Accordingly, the scope of the invention should not be considered limited to the specific arrangement of steps shown in FIG. 10.

The authentication device 100 reads the device ID from the portable device, and sends the same to the PC 200B (Step S1001).

Upon receiving the device ID, the PC 200B searches the volatile memory 212B or the non-volatile memory 214B for the one or more pieces of authentication information corresponding to the device ID (Step S1002), and determines whether the volatile memory 212B or the non-volatile memory 214B contains the corresponding authentication information (Step S1003).

Upon determining that the volatile memory 212B or the non-volatile memory 214B does not contain the corresponding authentication information (Step S1003: NO), the PC 200B notifies authentication failure to the user via the I/O interface 220B (Step S1004). Then the processing is terminated.

Upon determining that the volatile memory 212B or the non-volatile memory 214B contains the corresponding authentication information (Step S1003: YES), the PC 200B determines whether the one or more pieces of authentication information are valid, based on the expiration dates of the authentication information, and/or the upper limit number of time of issuance of the authentication information (Step S1005).

Upon determining that the one or more pieces of authentication information are invalid (Step S1005: NO), the PC 200B notifies authentication is failure via the I/O interface 220B (Step S1004). Then the processing is terminated.

Upon determining that the one or more pieces of authentication information are valid (Step S1005: YES), the PC 200B allows the user to log into the PC 200B (Step S1006). Thus, the user can operate the PC 200B with the workflows and/or applications, and/or can utilize the services provided by the cloud server 600 via the PC 200B and the network. Then the processing is terminated.

Embodiments of the invention may be implemented on virtually any type of computing system, regardless of the platform being used. For example, the computing system may be one or more mobile devices (e.g. a laptop computer, smart phone, personal digital assistant, tablet computer, or other mobile device), desktop computers, servers, blades in a server chassis, or any other type of computing device or devices that includes at least the minimum processing power, memory, and input and output devices to perform one or more embodiments of the invention. The computer processors 210B, 310 may be an integrated circuit for processing instructions. For example, the computer processors may be one or more cores, or micro-cores of a processor. Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

The authentication server and the authentication method of one or more embodiments provide various improvements to authentication technologies. For example, once the UPS starts to supply the power to the authentication server, the authentication information is transmitted to the client device before the authentication server is shut down. As a result, the authentication server is prevented from being completely shut down without any preparation due to sudden interruption of power supply, and the users can access the devices/services even in the case that the authentication server is shut down due to interruption of power supply.

Moreover, the authentication server of one or more embodiments compares the remaining time of power supply from the UPS with the required time for preparation of shutdown of the authentication server, and upon determining that the remaining time is equal to or more than the required time, transmits the authentication information to the client device. As a result, the authentication server can effectively utilize the remaining time for transmitting the authentication information before being shut down.

Furthermore, the authentication server of one or more embodiments may transmit one or more pieces of the authentication information to the client device depending on the number of users registered in the authentication server, the number of the client devices accessible to the authentication server, and/or the priority level for each of the client devices. As a result, the authentication server can effectively utilize the remaining time for transmitting the authentication information before being shut down.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

The invention claimed is:
1. An authentication server connected to a client device via a network, the authentication server comprising:
an uninterruptible power supply (UPS) that supplies power to the authentication server upon interruption of a main power supply;
a storage that stores a database comprising:
a piece of user information of a user of the client device; and
a piece of authentication information for the user to log into the client device or a predetermined server on the network via the client device; and
a processor that, once the UPS starts to supply the power to the authentication server, transmits to the client device the piece of authentication information corresponding to the piece of user information before the authentication server is shut down, wherein
the processor further:
calculates a remaining time of power supply from the UPS,
calculates a required time for preparation of shutdown of the authentication server,
compares the remaining time with the required time,
upon determining that the remaining time is less than the required time, prohibits the piece of authentication information from being transmitted to the client device, and
upon determining that the remaining time is equal to or larger than the required time, transmits the piece of authentication information to the client device under a predetermined condition.

2. The authentication server according to claim 1, wherein
the authentication server is connected to a plurality of client devices,
the database further comprises:
a plurality of pieces of user information of users of the client devices; and
a plurality of pieces of authentication information for the users to log into the client devices or the predetermined server, and
the processor:
upon determining that the remaining time is equal to or larger than the required time, determines whether a number of the users is equal to or larger than a predetermined number based on the plurality of pieces of user information, and
upon determining that the number of the users is equal to or larger than the predetermined number, determined that the predetermined condition is not met and prohibits the plurality of pieces of authentication information from being transmitted to the client devices.

3. The authentication server according to claim 1, wherein
the authentication server is connected to a plurality of client devices corresponding to a first piece of user information, and
the database further comprises:
the first piece of user information; and
a plurality of pieces of authentication information for the user to log into the client devices or the predetermined server, and
the processor:
upon determining that the remaining time is equal to or larger than the required time, determines whether a number of the client devices is equal to or larger than a predetermined number based on the first piece of user information, and
upon determining that the number of the client devices is equal to or larger than the predetermined number, determined that the predetermined condition is not met and prohibits the plurality of pieces of authentication information from being transmitted to the client devices.

4. An authentication server connected to a client device via a network, the authentication server comprising:
an uninterruptible power supply (UPS) that supplies power to the authentication server upon interruption of a main power supply;
a storage that stores a database comprising:
a piece of user information of a user of the client device; and
a piece of authentication information for the user to log into the client device or a predetermined server on the network via the client device; and
a processor that, once the UPS starts to supply the power to the authentication server, transmits to the client device the piece of authentication information corresponding to the piece of user information before the authentication server is shut down, wherein
the processor:
calculates a remaining time of power supply from the UPS,
calculates a required time for preparation of shutdown of the authentication server,
determines whether the remaining time is less than the required time, and
upon determining that the remaining time is less than the required time, prohibits the piece of authentication information from being transmitted to the client device,
the authentication server is connected to a plurality of client devices corresponding to a first piece of user information,
the database further comprises:
a plurality of pieces of authentication information for the user to log into the client devices or the predetermined server; and
a priority level for each of the client devices, and
the processor further:
determines whether the priority level of at least one of the client devices is less than a predetermined level, and
upon determining that the priority level of the one of the client device is less than the predetermined level, prohibiting one of the plurality of pieces of authentication information for the user to log into the one of the client devices or the predetermined server from being transmitted to the one of the client devices.

5. The authentication server according to claim 1, wherein the client device is a security door, a Multifunction Peripheral (MFP), a cellular phone, or a personal computer (PC), and
the predetermined server is a cloud server.

6. A non-transitory computer readable medium (CRM) storing computer readable program code that is executed by a computer as an authentication server being connected to a client device via a network and comprising an uninterruptible power supply (UPS), a storage, and a processor, and causes the computer to execute:
supplying, by the UPS, power to the authentication server upon interruption of a main power supply;
storing, in the storage, a database comprising:
a piece of user information of a user of the client device; and
a piece of authentication information for the user to log into the client device or a predetermined server on the network via the client device; and
once the UPS starts to supply the power to the authentication server, transmitting, by the processor to the client device, the piece of authentication information corresponding to the piece of user information before the authentication server is shut down, wherein
the computer further executes:
calculating, by the processor, a remaining time of power supply from the UPS,
calculating, by the processor, a required time for preparation of shutdown of the authentication server,
comparing, by the processor, the remaining time with the required time,
upon determining that the remaining time is less than the required time, prohibiting, by the processor, the piece of authentication information from being transmitted to the client device, and
upon determining that the remaining time is equal to or larger than the required time, transmitting, by the processor, the piece of authentication information to the client device under a predetermined condition.

7. The CRM according to claim 6, wherein
the authentication server is connected to a plurality of client devices,
the database further comprises:
a plurality of pieces of user information of users of the client devices; and
a plurality of pieces of authentication information for the users to log into the client devices or the predetermined server, and
the computer further executes:
upon determining that the remaining time is equal to or larger than the required time, determining, by the processor, whether a number of the users is equal to or larger than a predetermined number based on the plurality of pieces of user information; and
upon the processor determining that the number of the users is equal to or larger than the predetermined number, determining, by the processor, that the predetermined condition is not met and prohibiting the plurality of pieces of authentication information from being transmitted to the client devices.

8. The CRM according to claim 6, wherein
the authentication server is connected to a plurality of client devices corresponding to a first piece of user information,
the database further comprises:
the first piece of user information; and
a plurality of pieces of authentication information for the user to log into the client devices or the predetermined server, and
the computer further executes:
upon determining that the remaining time is equal to or larger than the required time, determining, by the processor, whether a number of the client devices is equal to or larger than a predetermined number based on the first piece of user information; and
upon the processor determining that the number of the client devices is equal to or larger than the predetermined number, determining, by the processor, that the predetermined condition is not met and prohibiting the plurality of pieces of authentication information from being transmitted to the client devices.

9. The CRM according to claim 6, wherein
the authentication server is connected to a plurality of client devices corresponding to a first piece of user information,
the database further comprises:
the first piece of user information;
a plurality of pieces of authentication information for the user to log into the client devices or the predetermined server; and
a priority level for each of the client devices, and
the computer further executes:
upon determining that the remaining time is equal to or larger than the required time, determining, by the processor, whether at least one of the client devices has the priority level less than a predetermined level; and
upon the processor determining that the one of the client device has the priority level less than the predetermined level, determining, by the processor, that the predetermined condition is not met and prohibiting one of the plurality of pieces of authentication information for the user to log into the one of the client devices or the predetermined server from being transmitted to the one of the client devices.

10. The CRM according to claim 6, wherein
the client device is a security door, a Multifunction Peripheral (MFP), a cellular phone, or a personal computer (PC), and
the predetermined server is a cloud server.

11. An authentication method using an authentication server that is connected to a client device via a network and comprises an uninterruptible power supply (UPS), a storage, and a processor, the method comprising:
supplying, by the UPS, power to the authentication server upon interruption of a main power supply;
storing, in the storage, a database comprising:
a piece of user information of a user of the client device; and
a piece of authentication information for the user to log into the client device or a predetermined server on the network via the client device; and
once the UPS starts to supply the power to the authentication server, transmitting, by the processor to the client device, the piece of authentication information corresponding to the piece of user information before the authentication server is shut down, wherein
the method further comprises:
calculating, by the processor, a remaining time of power supply from the UPS,
calculating, by the processor, a required time for preparation of shutdown of the authentication server,
comparing, by the processor, the remaining time with the required time,
upon determining that the remaining time is less than the required time, prohibiting, by the processor, the piece of authentication information from being transmitted to the client device, and
upon determining that the remaining time is equal to or larger than the required time, transmitting, by the processor, the piece of authentication information to the client device under a predetermined condition.

12. The authentication method according to claim 11, wherein
the authentication server is connected to a plurality of client devices,
the database further comprises:
a plurality of pieces of user information of users of the client devices; and
a plurality of pieces of authentication information for the users to log into the client devices or the predetermined server, and
the method further comprises:
upon determining that the remaining time is equal to or larger than the required time, determining, by the processor, whether a number of the users is equal to or larger than a predetermined number based on the plurality of pieces of user information; and
upon the processor determining that the number of the users is equal to or larger than the predetermined number, determining, by the processor, that the predetermined condition is not met and prohibiting the plurality of pieces of authentication information from being transmitted to the client devices.

13. The authentication method according to claim 11, wherein
the authentication server is connected to a plurality of client devices corresponding to a first piece of user information,
the database further comprises:
the first piece of user information; and
a plurality of pieces of authentication information for the user to log into the client devices or the predetermined server, and
the method further comprises:
upon determining that the remaining time is equal to or larger than the required time, determining, by the processor, whether a number of the client devices is equal to or larger than a predetermined number based on the first piece of user information; and
upon the processor determining that the number of the client devices is equal to or larger than the predetermined number, determining, by the processor, that the predetermined condition is not met and prohibiting the plurality of pieces of authentication information from being transmitted to the client devices.

14. The authentication method according to claim 11, wherein
the authentication server is connected to a plurality of client devices corresponding to a first piece of user information, storing, in the storage,
the database further comprises:
the first piece of user information;
a plurality of pieces of authentication information for the user to log into the client devices or the predetermined server; and
a priority level for each of the client devices, and
the method further comprises:
upon determining that the remaining time is equal to or larger than the required time, determining, by the processor, whether at least one of the client devices has the priority level less than a predetermined level; and
upon the processor determining that the one of the client device has the priority level less than the predetermined level, determining, by the processor, that the predetermined condition is not met and prohibiting one of the plurality of pieces of authentication information for the user to log into the one of the client devices or the predetermined server from being transmitted to the one of the client devices.

15. The authentication method according to claim 11, wherein
the client device is a security door, a Multifunction Peripheral (MFP), a cellular phone, or a personal computer (PC), and
the predetermined server is a cloud server.

* * * * *